US012745686B2

(12) United States Patent
Christiansen et al.

(10) Patent No.: US 12,745,686 B2
(45) Date of Patent: Sep. 29, 2026

(54) AGRICULTURAL SYSTEM AND METHOD FOR CHECKING CONTROLLABILITY OF A TOOL

(71) Applicant: AGCO International GmbH, Neuhausen (CH)

(72) Inventors: Martin Peter Christiansen, Randers (DK); Esma Mujkic, Randers (DK); Morten Stigaard Laursen, Randers (DK)

(73) Assignee: AGCO International GmbH, Neuhausen (CH)

( * ) Notice: Subject to any disclaimer, the term of this patent is extended or adjusted under 35 U.S.C. 154(b) by 127 days.

(21) Appl. No.: 18/645,048

(22) Filed: Apr. 24, 2024

(65) Prior Publication Data

US 2024/0389491 A1 Nov. 28, 2024

(30) Foreign Application Priority Data

May 25, 2023 (GB) ..................................... 2307855

(51) Int. Cl.

| | |
|---|---|
| ***A01B 63/00*** | (2006.01) |
| ***A01B 71/02*** | (2006.01) |
| ***A01D 78/10*** | (2006.01) |
| ***G06T 7/246*** | (2017.01) |
| ***G06T 7/277*** | (2017.01) |

(52) U.S. Cl.

CPC ............ *A01B 63/002* (2013.01); *G06T 7/246* (2017.01); *G06T 7/277* (2017.01); *A01B 71/02* (2013.01); *A01D 78/1028* (2013.01); *A01D 78/1092* (2013.01); *G06T 2207/30188* (2013.01); *G06T 2207/30204* (2013.01); *G06T 2207/30252* (2013.01)

(58) Field of Classification Search

CPC ....... A01B 63/002; A01B 71/02; G06T 7/246; G06T 2207/30204; A01D 78/1028

See application file for complete search history.

(56) References Cited

U.S. PATENT DOCUMENTS

| | | | | |
|---|---|---|---|---|
| 6,588,513 | B1 | 7/2003 | Gustafson | |
| 2017/0359953 | A1* | 12/2017 | Wallace | A01D 34/40 |
| 2022/0201920 | A1* | 6/2022 | McClelland | A01B 76/00 |
| 2023/0126679 | A1 | 4/2023 | Isaac | |

FOREIGN PATENT DOCUMENTS

| | | | | |
|---|---|---|---|---|
| CN | 111754577 | A * | 10/2020 | G06V 20/10 |
| EP | 2008508 | A1 | 12/2008 | |

OTHER PUBLICATIONS

CN111754577A English translated (Year: 2020).*

UK Intellectual Property Office, Search Report for related UK Application No. GB2307855.3, dated Oct. 10, 2023, 3 pages.

* cited by examiner

*Primary Examiner* — James J Lee
*Assistant Examiner* — Brandon S Lee

(57) ABSTRACT

An agricultural system having at least two connectors for moving a first tool with a first marker and a method are configured to check a controllability of the tool by connecting a first actuator with at least one of the least two connectors for moving the first tool in a first degree of freedom, triggering an actuation via one connector, receiving sensor information from a sensor unit capturing a first marker connected with the first tool and determining whether the first marker moves in the first degree of freedom in response to the triggered actuation via the one connector.

19 Claims, 6 Drawing Sheets

AGRICULTURAL SYSTEM AND METHOD FOR CHECKING CONTROLLABILITY OF A TOOL

FIELD

The present disclosure relates generally to an agricultural system and method for checking controllability of a tool of the agricultural system that may be used to perform an agricultural operation in an agricultural field.

BACKGROUND

Implements as ploughs, seeders, sprayers, mowers, tedders, rakes, etc. are used for the cultivation of agricultural fields. Such implements comprise one or more tools that are adapted to perform a treatment of the agricultural field for which the implement is provided for. For example, seeder comprises a seeding unit to place seeds into the soil, a sprayer comprises a nozzle to apply fertilizer or pesticide on crop and a rake comprises a rake rotor to form windrows. The tools are moveable relative to a frame of the implement. The position relative to the frame or the speed of the tool may be adjusted for the field operation. The tools can be driven by actuators that may be powered by electrical or hydraulic energy.

BRIEF SUMMARY

An implement may comprise different tools each driven by a corresponding actuator. To supply an actuator of a tool with energy, e.g. electrical or hydraulic energy, the actuator of a tool can be connected to an interface providing the required energy. For example, the interface may be connected with a power source such as a battery or a hydraulic pump for providing the electrical or hydraulic energy. Since different actuators may be connectable to different connectors of the interface, a flawless control of the tools requires a correct connection of each actuator with its corresponding connector(s). Thus, it is an objective to check whether each actuator is connected correctly with the interface for a flawless control of each tool of the implement.

According to an aspect of the invention there is provided an agricultural system comprising a vehicle interface with at least two connectors for connecting at least one actuator, an implement with a chassis member, a first tool relatively moveable in a first degree of freedom in respect of the chassis member and a first marker assigned to the first tool. The agricultural system further comprises a sensor unit configured to capture the first marker. The agricultural system further comprises a first actuator connectable with at least one of the connectors for moving the first tool in the first degree of freedom. The agricultural system also comprises a control unit configured to receive sensor information from the sensor unit, to trigger an actuation via one of the at least two connectors and to determine whether the first marker moves in the first degree of freedom in response to the triggered actuation via the one connector.

The agricultural system may comprise a vehicle comprising the vehicle interface for connecting the implement with the vehicle. The vehicle may be an agricultural vehicle such as a tractor, a harvester, a combine or any other type of vehicle. The implement may be of any type having at least one tool to perform a field operation intended to be executed according to the type of the implement. For example, the implement may be a rake having a rake rotors as the relatively moveable first tool.

The implement may be connected to the vehicle interface. The vehicle interface may be located at a rear side or at a front side of the vehicle. The vehicle interface may comprise two or more connectors for transferring energy to an actuator connected to at least one of the connectors. For example, a connector may be an electrical connector for transferring electrical energy to an electrical actuator such as an electrical motor. A connector could also be a hydraulic connector for transferring hydraulic energy to a hydraulic actuator such as a hydraulic cylinder. A connector could also be a mechanical connector for transferring mechanical energy to a mechanical actuator such as a power take-off (PTO). The at least two connectors may be supplied by one or more energy sources to provide energy to the at least two connectors. The energy sources may be of different type such as electrical (e. g. a battery), hydraulic (e. g. a pump) or mechanical (e. g. a motor) energy source. Each connector may be used as input and/or output of energy. For example, an actuator may be connected to one connector for transferring energy from and to the energy source and the actuator. Alternatively, an actuator may be connected to two connectors of the vehicle interface for transferring energy from the energy source to the actuator via one connector and for transferring energy from the actuator to the energy source via the other connector. The vehicle interface may comprise two, three or more connectors for connecting two or more actuators.

The control unit may trigger an actuation via one of the at least two connectors by sending a test signal via the one of the at least two connectors. The test signal may be an electrical, a hydraulic or any other kind of test signal depending on the type of the connector. The trigger, e. g. the test signal, may be an impulse. Depending on whether the first actuator is connected with the connector via which the actuation has been triggered (or not), the first actuator will receive the trigger (or not). Accordingly, the first tool will be driven by the first actuator and the first marker will move (or not). The control unit may receive sensor information from the sensor unit whether the first marker has been moved in response to the triggered actuation and determine that the first actuator is connected with the connector via which the actuation has been triggered if the first marker has been moved in the first degree of freedom or that the first actuator is not connected with the connector via which the actuation has been triggered if the first marker has not been moved. The result may be outputted by the control unit to an operator of the agricultural system on a human machine interface (HMI). For the case that a movement of the first marker has been expected due to the triggered actuation, the control unit may create an error signal if the first marker has not been moved in the first degree of freedom.

The sensor unit may comprise one or more sensors of any type capable of sensing the first marker as for example a 3D camera, infrared (IR) camera, LIDAR, radar, etc. or any combination of these different sensor types. The sensor unit may be adapted to the first marker accordingly to detect a movement of the first marker. The sensor unit may capture images of the first marker and analyze the pattern of the first marker to determine angular position and rate of the first tool to which the first marker is attached. For example, first marker is used to calculate the relative pose of the first tool with respect to the sensor unit. The high-order factors such as angular acceleration and jerk can be estimated by using a Kalman filter that takes input from both the angle and angular rate data. The sensor unit may additionally provide key feature tracking to improve accuracy and robustness. Key feature tracking enables the detection of important features of the image, such as edges, corners, ridges, and blobs, and the tracking how they align in the next image in the sequence. Optionally, the sensor unit may execute monocular depth estimation algorithms to estimate depth information from a single camera image, improving the accuracy of marker detection and pose estimation.

The sensor unit may comprise a perception sensor. The perception sensor may be of the type of a 2D-camera, a stereo camera, a time-of-flight (ToF) camera or a lidar, for example. A ToF camera could provide depth information and improve accuracy of detection and pose estimation of the first marker. A lidar could provide 3D point cloud data for detection and improved pose estimation of the first marker. In case of a camera, the perception sensor may capture 2D or 3D images, gray-scale images, color images in any color space as for example in red-green-blue (RGB) color space, or multispectral images. The perception sensor may capture the environment around the agricultural system and may be oriented towards the implement so that the first marker can be captured for all positions or orientations the first marker can take. The sensor unit could comprise multi-camera setup to provide multiple views of agricultural system and to improve the accuracy of detection and pose estimation of the first marker as well as to increase robustness to occlusions and shadows.

The perception sensor may comprise an optical lens such as a standard pin-hole lens or a fish-eye lens, for example. The fish-eye lens may be of the type of a F-theta lens, a F-tan lens, a tailored distortion lens or a fovea lens, for example. The perception sensor may comprise a color filter to better detect specific wavelengths, for example the wavelengths of the light reflected from the first marker. The filter may pass selected spectral bands such as ultraviolet, infrared or other bands.

The perception sensor may also comprise a detector and processing circuitry. The optical lens may collect and direct light from a field of view of the perception sensor through a filter to the detector and serve to focus and/or magnify images. The detector may be a digital image sensor that converts electromagnetic energy to an electric signal and employs image sensing technology such as charge-coupled device (CCD) technology and/or complementary metal oxide semiconductor (CMOS) technology. The processing circuitry may include a circuitry for amplifying and processing the electric signal generated by the detector to generate image data, which is passed to the one or more computing devices such as the control unit.

The sensor unit may optionally comprise an external light source such as natural ambient light or an artificial light source such as a light mounted on the agricultural system. The light source may be configured and used specifically for capturing images with the perception sensor. The light source may be a flashing lamp or a light emitting diode (LED) to improve image quality in low-light conditions such as during nighttime operations. The lamp could be an internal light source of the agricultural system that has been modified for this purpose.

The first marker is assigned to the first tool so that a movement of the first tool is detectable by the sensor unit capturing the first marker. It is sufficient that the first marker can be captured by the sensor unit whereas the first tool itself may be out of a sensing range of the sensor unit. The first marker may be attached to the first tool. Thus, a movement of the first tool corresponds directly with a movement of the first marker. So, the first marker serves as reference point that can be detected by the sensor unit and used to calculate the position and orientation of the tool. The first marker may be designed as a retrofit kit so that implements without any markers can be equipped with a first marker later.

The control unit may be configured to determine the direction of the movement of the first marker.

The first degree of freedom may provide two or more different movement directions into which the first marker may be moved. For example, in case of a rotational first degree of freedom, the first marker may rotate into a left or a right direction. In case of a translational first degree of freedom, the first marker may move in a forward or backward direction. The direction into which the first marker may move due to the triggered actuation may depend on to which connector the first actuator is connected with. For example, the first actuator may be connected to two different connectors to drive the first actuator into two different directions causing the first marker to be moved into the one or the other movement direction. The control unit may determine the direction of the movement of the first marker based on the sensor information received from the sensor unit. Thus, the control unit may not only check whether the first marker moves in the first degree of freedom in response to the triggered actuation via the one connector but also whether the first marker moves into the direction into which the first marker may be expected to be moved. If this is not the case, the control unit may create an error signal to indicate that the first marker may move in the wrong direction and that the first actuator driving the first tool may be connected to the wrong connector(s) of the vehicle interface. So, the movement direction can be changed by changing the connectivity of the first actuator.

The first marker may comprise an optical code.

The optical code may be designed as a bar code, a QR code, an ArUco code, an AprilTag or any other pattern that may be recognizable by an optical sensor such as a camera. The pattern may be arranged in a circular shape to define a circular pattern. The pattern may comprise small and large dots arranged in a specific sequence that represents a unique identifier for identifying the first tool to which the first marker is attached. The pattern may be printed onto relevant surfaces of the first tool. The optical code may be a black and white code or a colored code. Alternatively, the first marker may be of another type as for example an emitter of electromagnetic waves. The electromagnetic waves may be part of the visible light spectrum or invisible spectrum. For example, the first marker may comprise a sequence LEDs in the visible spectrum to define a circular pattern. To ensure detection even in low-visibility conditions, such as dusty or nighttime environments, the wavelength of the LEDs may ideally be in the 625-660 nm range, but could also be higher, such as 700 nm or 800 nm. Optionally, the first marker could be designed as an element emitting a magnetic field or as a passive element such as a RFID-chip.

The control unit may be configured to determine the number of markers assigned to tools.

The implement may comprise one or more tools and one or more markers assigned to each tool. I. e. one or more markers may be assigned to one and the same tool, other markers to different tools. Nevertheless, the sensor unit may be configured to capture all markers of the implement and to send corresponding sensor information to the control unit. Based on the received sensor information, the control unit may recognize each marker assigned to any tool and count all these markers.

The control unit may be configured to distinguish the first marker from other markers.

Each marker may comprise an unique identifier. Thus, the control unit may distinguish each marker form each other marker. As mentioned above, the identifier may be designed as an optical code but also other types of an identifier may be possible as for example emitters of electromagnetic waves in the invisible infrared spectrum.

When the control unit triggers an actuation via one of the at least two connectors, the first marker or any other marker may move in response to the triggered actuation via the one connector depending on whether the first actuator or any another actuator is connected with the connector via which the actuation has been triggered. Based on the sensor information received from the sensor unit, the control unit may determine the marker that has been moved and identify the marker based on its unique identifier. Thus, the control unit can determine which of the markers has been moved and distinguish this marker from the other (static) markers. In addition, the control unit may check whether a marker to be expected to be moved has been moved. If not, the control unit may create an error signal to indicate that the marker to be expected to be moved has not been moved and to indicate that the actuator driving this marker may be connected to the wrong connector of the vehicle interface.

The control unit may be configured to trigger actuations sequentially via at least two of the at least two connectors.

The control unit may trigger actuations via two or more connectors of the vehicle interface to check the movement of one or more markers other than the first marker. To avoid triggering the actuations at the same time resulting in simultaneous movements of the first marker and the other marker(s), the control unit may trigger an actuation via a connector after a triggered actuation via the other connector has been finished. For example, the control unit may toggle the connectors for triggering the actuation. Thus, only one marker may move in response to the triggered actuation for enabling the control unit to distinguish the marker which has been moved from the other static markers and to identify the marker which has been moved. The control unit may sequentially trigger an actuation via each connector of the vehicle interface to determine whether all markers may move in an expected degree of freedom in response to the corresponding trigger.

The first degree of freedom may be of a rotational type or a translational type.

The type of the first degree of freedom may depend on the type of the joint by which the first tool is connected with the implement. The joint may be a rotational or a translational joint. The first degree of freedom may provide two (or more) movement directions, e. g. a rotation in a left or right direction or a translation in a forward or backward direction. The first actuator may be connected with the first tool and may transform the energy received from the connector to another type of energy, e. g. by transforming electrical energy into mechanical energy or hydraulic energy into mechanical energy for a rotational or translational movement of the first tool.

The control unit may be configured to determine whether the first marker moves rotationally or translationally in response to the triggered actuation of the first actuator.

The first marker may comprise two or more degrees of freedom, such as a rotational degree of freedom and a translational degree of freedom. The first actuator may be triggered to cause a movement of the first marker in one of the degrees of freedom and another actuator may be triggered to cause a movement of the first marker in the other degree of freedom. Depending on which of the two actuators is actuated by the triggered actuation, the first marker may rotate or move translationally. The control unit may receive a sensor information from the sensor unit capturing the movement of the first marker and determine based on the sensor information whether the first marker moves rotationally or translationally in response to the triggered actuation of the first actuator. I. e., the control unit determines the type of the degree of freedom of the first marker. Thus, the control unit may check whether the first marker has been moved in a degree of freedom in which a movement of the first marker has been expected. If not, the control unit may create an error signal to indicate that the first marker has been moved in the wrong degree of freedom and that the first actuator may be connected to the wrong connector of the vehicle interface.

The control unit may be configured to determine any end position of the first degree of freedom.

The first tool may be moveable between a (mechanical) end stop at an initial position and a (mechanical) end stop at a final position. I. e., a free movement of the first marker in the first degree of freedom may be limited due to the end stops of the first tool to which the first marker is assigned. When the first tool is actuated by its actuator and reaches an end stop, the first tool will stop its movement at the end stop even if the first tool is still actuated. The first marker assigned to the first tool will also stop to move. Based on sensor information of the first marker captured by the sensor unit and received by the control unit, the control unit detects the position at which the first marker has stopped moving and determines that an end position of the first degree of freedom is reached. Thus, the control unit may determine the operational range of the first degree of freedom. The end position(s) can be stored in a memory of the control unit for comparing and validating the end position(s).

The first tool may be moveably connected with the chassis member by at least one joint and the control unit may be configured to determine the type of the joint.

For example, the type of the joint of the first tool may be a geared revolute joint (gearbox), a revolute joint (revolute), a combination of two revolute joints connected in series (revolute2), a prismatic joint (translational), a cylindrical joint (translational and rotational), a ball joint (ball), a socket joint (ball), a slider joint with rotation around the translation axis (piston) or any other type. The control unit may determine the type of the joint based on the determination of (type of the) degree of freedom and/or the operational range of the degree of freedom as described above. For example, a revolute joint may be detected based on a rotational degree of freedom without any end positions and a prismatic joint may be detected based on a translational degree of freedom and two end positions of the translational degree of freedom.

The agricultural system may comprise a second actuator connectable with at least one of the connectors for moving the first tool in a second degree of freedom different to the first degree of freedom, wherein the first tool may be moveable in the second degree of freedom in respect of the chassis member. The control unit may be configured to determine whether the first marker moves in the first degree of freedom or in the second degree of freedom in response to the triggered actuation via the one connector.

The first degree of freedom may be a translational degree of freedom to adjust an axial position of the first tool and the second degree of freedom may be a rotational degree of freedom to adjust a rotational position of the first tool. Alternatively, both the first and the second degree of freedom may be rotational degrees of freedom wherein the first and the second degree of freedom have different rotation axes. Alternatively, both the first and the second degree of freedom may be translational degrees of freedom wherein the translational axes of the first and the second degree of freedom are different. When the first tool is moved in the first or the second degree of freedom, the first marker will move accordingly in the same degree of freedom. The control unit may trigger an actuation via one of the connectors and detect whether the first marker moves in the first or in the second degree of freedom. If the first marker moves in the first degree of freedom, the first actuator is connected with the one connector. If the first marker moves in the second degree of freedom, the second actuator is connected with the one connector. Thus, the control unit may determine whether the first actuator or the second actuator is connected with the one connector.

The agricultural system may comprise a second tool relatively moveable in respect of the chassis member, a second marker assigned to the second tool and at least a third actuator connectable with at least one of the connectors for moving the second tool, wherein the sensor unit may be configured to capture the second marker. The control unit may be configured to determine whether the first marker or the second marker moves in response to the triggered actuation via the one connector.

The control unit can distinguish the first and the second marker based on their assigned first and second marker. The control unit may trigger an actuation via the one connector. If the first marker moves, an actuator of the first tool is connected with the one connector. If the second marker moves, an actuator of the second tool is connected with the one connector. Thus, the control unit may determine which of the first and second tool is connected with the one connector. Analogously, the control unit may sequentially trigger an actuation via each other connector to determine the connection of each tool.

The control unit may be configured to trigger an actuation via each of the at least two connectors and to determine whether all markers connected with tools have been moved when an actuation via each of the connectors has been triggered.

The control unit may sequentially trigger an actuation via each the at least two connectors, e. g. by toggling the connectors. If a marker has not moved after an actuation has been triggered via each connector, the control unit may determine an error. For example the tool which has not moved may be blocked or disconnected from the vehicle interface.

The control unit may be configured to determine whether the first marker may be moveable in a first degree of freedom only or in a first and a second degree of freedom.

The control unit may sequentially trigger an actuation via each connector of the vehicle interface, e. g. for toggling the connectors. When the first marker moves after a triggered actuation, the control unit may check whether the movement complies with the first degree of freedom since a degree of freedom may allow a movement in two different directions (e. g. left or right rotation). As long as the movement complies with the first degree of freedom the control unit may detect only one degree of freedom, otherwise an additional second degree of freedom. Thus, the control unit may determine the number of degrees of freedom of the first tool.

The control unit may be configured to trigger an actuation via each of the at least two connectors according to a predefined sequence and to check whether the movement of the first marker complies with the predefined sequence.

The predefined sequence may define via which connector at which time point an actuation will be triggered by the control unit. Depending on the connector via which an actuation has been triggered according to the predefined sequence, a corresponding movement of the first marker in a specific direction may be expected. For example, a left rotation of the first marker due to a first triggered actuation via the second connector and a horizontal raising of the first marker due to a subsequent triggered actuation via the first connector may be expected. Thus, the control unit may check whether the determined movements of the first marker caused by the executed sequence comply with the expected movements. If not, the control unit may determine a wrong connection of the actuator(s) of the first tool with the vehicle interface.

The vehicle interface may comprise at least two connectors and two of the at least two of the connectors may be of a different type.

The implement may comprise two or more actuators of different type, as for example an electric actuator, a hydraulic actuator or a mechanical actuator. Thus, the vehicle interface may comprise connectors according to the type of the actuators of the implement so that all actuators of the implement can be connected with a corresponding connector of the vehicle interface.

Another aspect includes a method of checking a controllability of a tool of an agricultural system having at least two connectors for moving a first tool comprising a first marker. The method comprises steps for connecting a first actuator with at least one of the least two connectors for moving the first tool in a first degree of freedom, triggering an actuation via one connector, receiving sensor information from a sensor unit capturing a first marker connected with the first tool and determining whether the first marker moves in the first degree of freedom in response to the triggered actuation via the one connector.

The method may be carried out by the control unit at least partly. I. e., some method steps may be executed automatically, others manually by an operator. The operator may interact with the control unit to initiate the method steps to be carried out by the control unit. For example, the first actuator may be connected manually to a connector of the vehicle interface. Then, the control unit may trigger an actuation via one of the at least two connectors by sending a test signal via the one of the at least two connectors. The test signal may be an electrical, a hydraulic or any other kind of test signal depending on the type of the connector. The trigger, e. g. the test signal, may be an impulse. Depending on whether the first actuator is connected with the connector via which the actuation has been triggered (or not), the first actuator will receive the trigger (or not). Accordingly, the first tool will be driven by the first actuator and the first marker will move (or not). The control unit may receive sensor information from the sensor unit to determine whether the first marker has been moved in response to the triggered actuation. Based on the sensor information, the control unit may determine that the first actuator is connected with the connector via which the actuation has been triggered if the first marker has been moved in the first degree of freedom or that the first actuator is not connected with the connector via which the actuation has been triggered if the first marker has not been moved. The result may be outputted by the control unit to an operator of the agricultural system. For the case that a movement of the first marker has been expected due to the triggered actuation, the control unit may create an error signal if the first marker has not been moved in the first degree of freedom.

The method may comprise a step for determining whether the first marker moves in a first degree of freedom only or in a first and a second degree of freedom, and determining a type of a joint of the first tool if the first marker moves in the first degree of freedom only.

The control unit may determine whether the first marker moves in a first degree of freedom only or in a first and a second degree of freedom in response to the triggered actuation. If the first marker moves simultaneously in both the first and the second degree of freedom in response to the triggered actuation, the joint of the first tool is a multi-jointed joint having more than one degree of freedom. Then, the control unit may proceed to find a joint of this or another tool having one degree of freedom only. If the first marker moves in one degree of freedom only, here the first degree of freedom, then the control unit may determine the type of the joint based on the determination of (type of the) degree of freedom and/or the operational range of the degree of freedom as described above. The control unit may determine whether the first marker moves rotationally or translationally in response to the triggered actuation and determine the type of the first degree of freedom depending on whether the first marker moves rotationally or translationally as described above.

The method may comprise steps for connecting a second actuator with at least one of the connectors for moving the first tool comprising the first marker in a second degree of freedom and determining whether the first marker moves in the first degree of freedom or in the second degree of freedom in response to the triggered actuation via the one connector.

The first degree of freedom may be a translational degree of freedom to adjust an axial position of the first tool and the second degree of freedom may be a rotational degree of freedom to adjust a rotational position of the first tool. When the first tool is moved in the first or the second degree of freedom, the first marker will move accordingly in the same degree of freedom. The second actuator may be connected manually to a connector of the vehicle interface. Then, the control unit may trigger an actuation via one of the connectors and detect whether the first marker moves in the first or in the second degree of freedom. If the first marker moves in the first degree of freedom, the first actuator is connected with the one connector. If the first marker moves in the second degree of freedom, the second actuator is connected with the one connector. Thus, the control unit may determine whether the first actuator or the second actuator is connected with the one connector.

The method may comprise steps for connecting at least a third actuator with at least one of the connectors for moving a second tool comprising a second marker and determining whether the first marker or the second marker moves in response to the triggered actuation via the one connector.

The third actuator may be connected manually to a connector of the vehicle interface. Then, the control unit may trigger an actuation via the one connector. If the first marker moves, an actuator of the first tool is connected with the one connector. If the second marker moves, an actuator of the second tool is connected with the one connector. Thus, the control unit may determine which of the first and second tool is connected with the one connector. Analogously, the control unit may sequentially trigger an actuation via each other connector to determine the connection of each tool of the implement.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
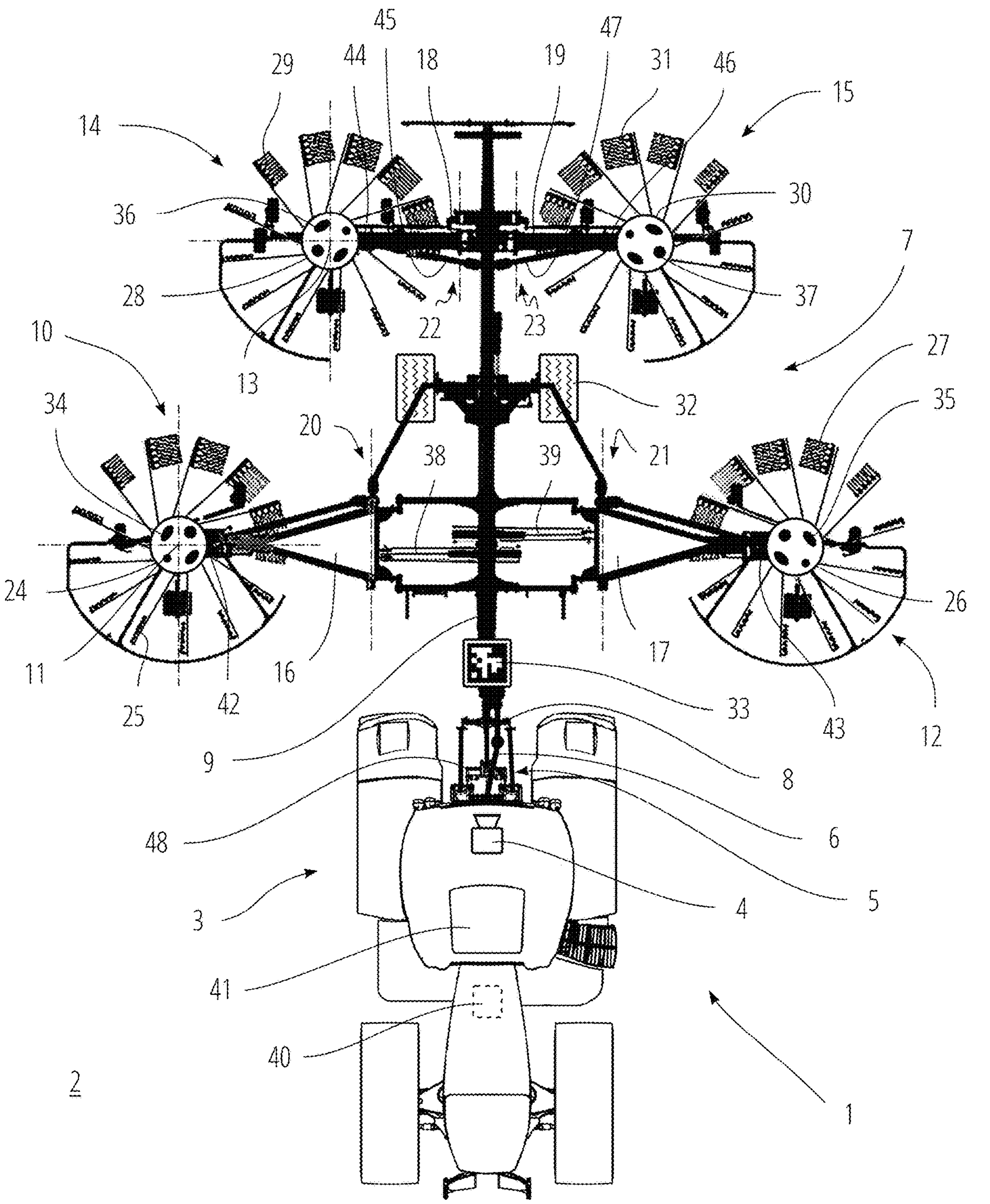
FIG. 1 illustrates an agricultural system comprising a vehicle connected with an implement in an operational position.

FIG. 1 shows an agricultural system 1 on an agricultural field 2. The agricultural system 1 comprises a vehicle 3, an implement 7, a sensor unit 4 and a control unit 40. The vehicle 3 is an agricultural vehicle such as a tractor, for example. But the vehicle 3 can be of any other type such as a truck or a pickup.

The control unit 40 is integrated in the vehicle 3. The sensor unit 4 is attached to a top of a cabin of the vehicle 3. In addition, the vehicle 3 comprises an absolute positioning system 41 comprising an inertial measurement unit (IMU) and/or a global navigation satellite system (GNSS) receiver (see FIG. 1). The IMU may provide additional orientation information for improving the accuracy of the global pose estimates. Alternatively, the control unit 40, the absolute positioning system 41 and the sensor unit 4 may be attached to other parts of the agricultural system 1. For example, the control unit 40 and the absolute positioning system 41 could be integrated in the implement 7.

The vehicle 3 comprises a vehicle interface 5 for connecting the implement 7 with the vehicle 3. The vehicle interface 5 comprises a hitch assembly 48 and a connector 6 designed as a power take-off. A mounting linkage 8 of the implement 7 is connected to the hitch assembly 48 to pull the implement 7 over the agricultural field 2 when the vehicle 3 moves. The hitch assembly 48 may be designed as a 3-point hitch. The hitch assembly 48 is adjustable to raise or lower the connected mounting linkage 8 of the implement 7. Optionally, the hitch assembly 48 can be adjusted in a horizontal direction to move the mounting linkage 8 to a left or right direction in respect of the vehicle 3. The connector 6 is connected with an input shaft of the implement 7 for transferring a drive torque to the implement 7.

The implement 7 may be of any type as for example a plough, a seeder, a sprayer, a mower, a tedder, a rake, etc. for cultivation of the agricultural field 2. The implement 7 comprises one or more tools. The type of the tools depends on the type of the implement. In case of a seeder the tool may be designed as a seeding unit whereas in case of a sprayer the tool may be designed as a spraying nozzle. Here by way of example, as can be seen in FIG. 1, the implement 7 is designed as a rake comprising four rake rotors, e. g. such as the implement disclosed in U. S. patent application 2020/0323142 A1, entitled “Agricultural Implement”, published on Oct. 14, 2020, which is hereby incorporated by reference in its entirety.

Next to the mounting linkage 8, the implement 7 comprises a chassis member 9, a wheel 32, first tool holder 16 with a first tool 10, a second tool holder 17 with a second tool 12, a third tool holder 18 with a third tool 14 and a fourth tool holder 19 with a fourth tool 15. Each of the first to fourth tools 10, 12, 14, 15 are designed as rake rotors each comprising several tines (25, 29, 31, 27). The tines 25, 29, 31, 27 of the first to fourth tools 10, 12, 14, 15 may grab crop such as grass or hay lying on the agricultural field 2 and form the crop to windrows.

The first tool 10 comprises a hub 24 with an integrated revolute joint for a rotational connection about a rotation axis 11 with the first tool holder 16. The first tool holder 16 has a hinge joint 20 designed as a revolute joint for a pivotable connection with the chassis members 9 of the implement 7. I. e., the first tool 10 comprises two different rotational degrees of freedom (first and second degree of freedom). A first actuator 42, integrated in the hub 24, drives the first tool 10 in the first degree of freedom for a rotational movement about the rotation axis 11. A second actuator 38 attached between the chassis member 9 and the first tool holder 16 drives the first tool holder 16 for pivoting the first tool holder 16 about the hinge joint 20 so that the first tool 10 is moved in the second degree of freedom.

Figure 3:
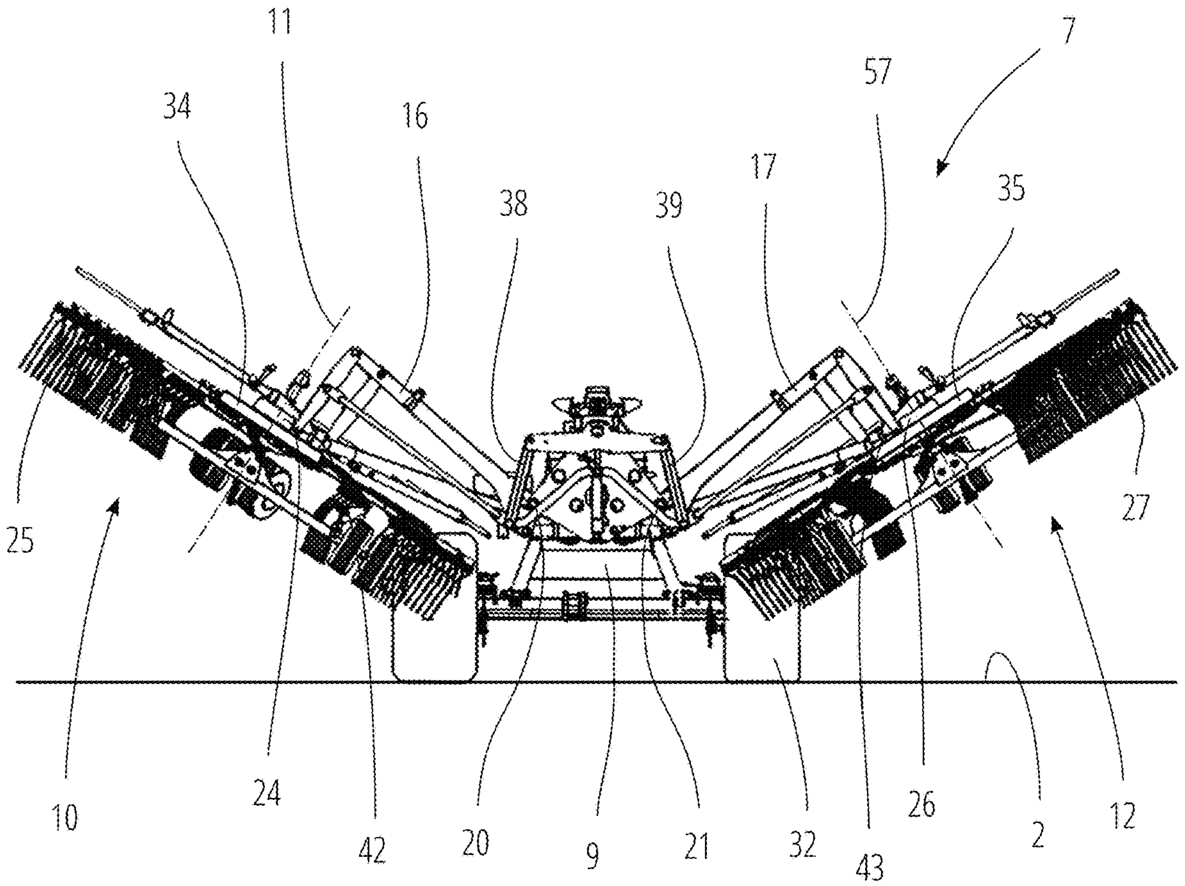
FIG. 3 illustrates the implement out of the operational position.

Analogously, the second tool 12 comprises a hub 26 with an integrated revolute joint for a rotational connection about a rotation axis 57 (see FIG. 3) with the second tool holder 17. The second tool holder 17 has a hinge joint 21 designed as a revolute joint for a pivotable connection with the chassis members 9 of the implement 7. I. e., the second tool 12 comprises two different rotational degrees of freedom. A third actuator 43, integrated in the hub 26, drives the second tool 12 in the one degree of freedom for a rotational movement about the rotation axis 57. An additional actuator 39 attached between the chassis member 9 and the second tool holder 17 drives the second tool holder 17 for pivoting the second tool holder 17 about the hinge joint 21 so that the second tool 12 is moved in the other degree of freedom.

Analogously, the third tool 14 comprises a hub 28 with an integrated revolute joint for a rotational connection about a rotation axis 13 with the third tool holder 18. The third tool holder 18 has a hinge joint 22 designed as a revolute joint for a pivotable connection with the chassis members 9 of the implement 7. I. e., the third tool 14 comprises two different rotational degrees of freedom. An actuator 44, integrated in the hub 28, drives the third tool 14 in the one degree of freedom for a rotational movement about the rotation axis 13. An additional actuator 45 attached between the chassis member 9 and the third tool holder 18 drives the third tool holder 18 for pivoting the third tool holder 18 about the hinge joint 22 so that the third tool 14 is moved in the other degree of freedom.

Analogously, the fourth tool 15 comprises a hub 30 with an integrated revolute joint for a rotational connection with the fourth tool holder 19. The fourth tool holder 19 has a hinge joint 23 designed as a revolute joint for a pivotable connection with the chassis members 9 of the implement 7. I. e., the fourth tool 15 comprises two different rotational degrees of freedom. An actuator 46, integrated in the hub 30, drives the fourth tool 15 in the one degree of freedom for a rotational movement relatively to the fourth tool holder 19. An additional actuator 47 attached between the chassis member 9 and the fourth tool holder 19 drives the fourth tool holder 19 for pivoting the fourth tool holder 19 about the hinge joint 23 so that the fourth tool 15 is moved in the other degree of freedom.

Hence, each of the first to fourth tools 10, 12, 14, 15 has two different rotational degrees of freedom for rotating relatively to its corresponding tool holder about a corresponding rotation axis and for pivoting relatively to the chassis member 9 of the implement 7 about a corresponding hinge joint. Each of the first to fourth tools 10, 12, 14, 15 can be moved by two separate actuators.

The actuators 42, 43, 44 and 46 for rotating the tools 10, 12, 14 and 15 relatively to their tool holders 16, 17, 18 and 19 are of the same type and can be designed as rotational motors. The rotational motors can be electric motors or hydraulic motors.

The actuators 38, 39, 45 and 47 for pivoting the tool holders 16, 17, 18 and 19 are of the same type and are designed each as a linear actuator in the form of a hydraulic cylinder comprising an translational movable piston connected with their corresponding tool holder 16, 17, 18 and 19. I. e., each actuator 38, 39, 45 and 47 comprises a translational degree of freedom for moving the piston back and forth in the cylinder. When an actuator 38, 39, 45 or 47 is actuated, the piston moves the corresponding tool holder 16, 17, 18 or 19 so that the translational movement of the piston is transformed into a pivoting movement of the corresponding tool holder 16, 17, 18 or 19 about its corresponding hinge joint 20, 21, 22 or 23 to lower the tool holder 16, 17, 18 or 19 with their tools 10, 12, 14 or 15 in an operational position (see FIG. 1) or to raise the tool holder 16, 17, 18 or 19 with their tools 10, 12, 14 or 15 out of the operational position (see FIG. 3).

So, the tools 10, 12, 14 and 15 can be lowered or raised by their tool holders 16, 17, 18 and 19 to be moved in or out of the operational position. In the operational position of the first to fourth tools 10, 12, 14, 15 as depicted in FIG. 1, the tines of the rake rotors may be brought in engagement with the agricultural field 2 for performing a field operation as forming windrows for example. This position corresponds to an unfolded position of the first to fourth tool holders 16, 17, 18, 19. Instead, when the first to fourth tools 10, 12, 14, 15 are positioned out of the operational position as exemplarily depicted in FIG. 3 for the first and second tool 10, 12, the tines of the rake rotors may be brought out of engagement with the agricultural field 2 for avoiding a field operation by the implement 7. This position corresponds to a folded position of the corresponding tool holders since the width of the implement 7 can be reduced in comparison to the unfolded position.

A first marker 34 is assigned and fixedly attached to the first tool 10 so that the first marker 34 moves synchronously with the first tool 10 when the first tool 10 is rotated about the rotation axis 11, pivoted about the hinge joint 20 or moved due to an adjustment of the implement 7 by the hitch assembly 48 of the vehicle 3. Analogously, a second marker 35 is assigned and attached to the second tool 12, a third marker 36 is assigned and attached to the third tool 14 and a fourth marker 37 is assigned and attached to the fourth tool 15 so that the second, third and fourth markers move synchronously with their corresponding tools, too. Hence, each of the first to fourth markers 34, 35, 36, 37 has the same two rotational degrees of freedom as the tool (10, 12, 14, 15) to which each of the first to fourth markers 34, 35, 36, 37 is attached to. Each of the first to fourth markers 34, 35, 36, 37 are relatively moveable in respect of another of the first to fourth markers 34, 35, 36, 37.

The height of each of the first to fourth markers 34, 35, 36, 37 is adjustable between a working and a lifting position. When one of the first to fourth tools 10, 12, 14, 15 is moved in the operational position (see FIG. 1) or out of the operational position (see FIG. 3) the height of the marker attached to the corresponding tool is adjusted from a lower position to a higher position or vice versa. When one of the first to fourth tools 10, 12, 14, 15 is in an operational position the corresponding marker attached to this tool is then in a working position representing a lower position. When one of the first to fourth tools 10, 12, 14, 15 is out of an operational position the corresponding marker attached to this tool is then in a lifting position representing a higher position.

In addition to the four markers 34, 35, 36, 37 being relatively moveable in respect of the chassis member 9, a basic marker 33 is attached to the chassis member 9 of the implement 7. Hence, the first to fourth markers 34, 35, 36, 37 are also relatively moveable in respect of the basic marker 33. The basic marker 33 moves synchronously with the chassis member 9 when the relative position of the implement 7 in respect of the vehicle 3 is adjusted by the hitch assembly 48.

Figure 5A:
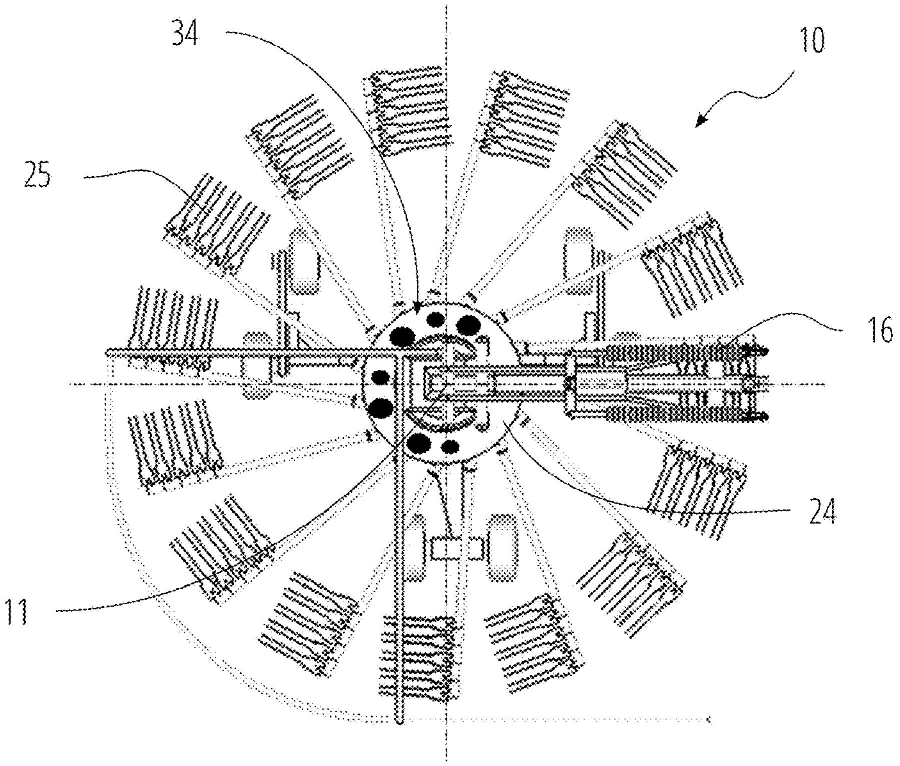
FIG. 5A illustrates a tool of the implement with a first type of a marker.
Figure 5B:
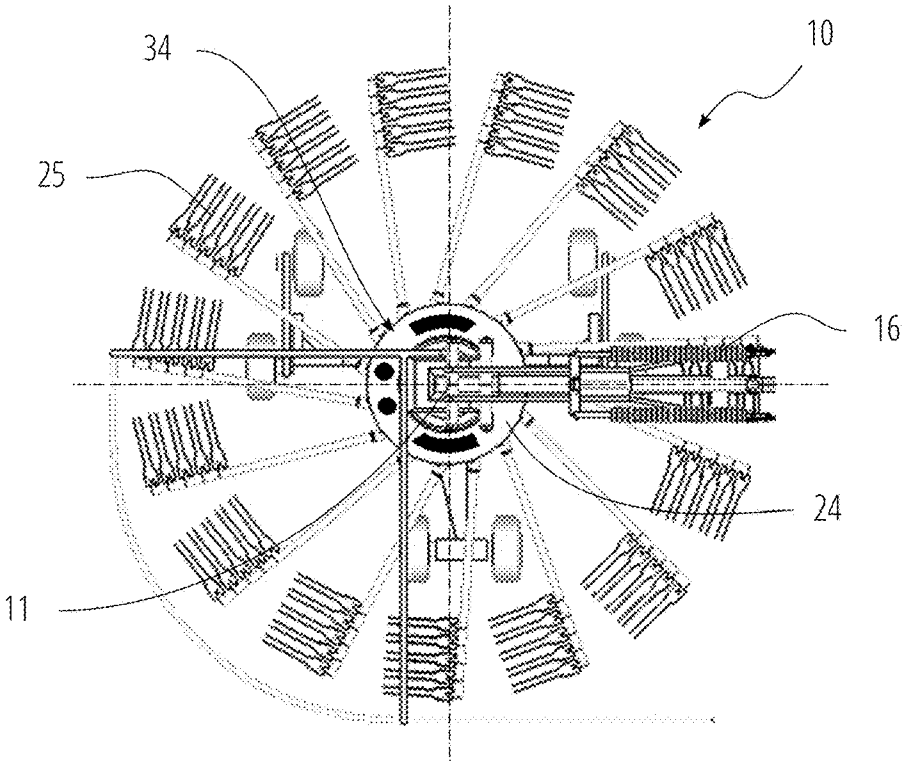
FIG. 5B illustrates a tool of the implement with a second type of a marker.
Figure 5C:
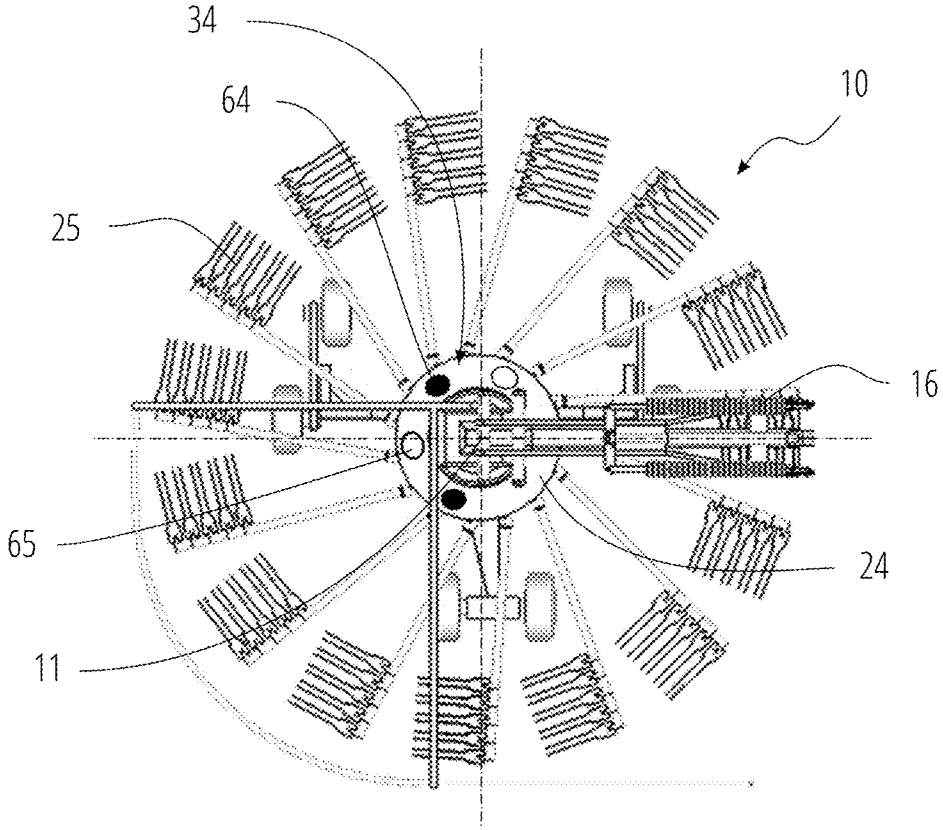
FIG. 5C illustrates a tool of the implement with a third type of a marker.

The basic marker 33 and the first to fourth markers 34, 35, 36, 37 may each comprise an optical code with a different pattern to distinguish each marker form another one. The different patterns may be QR-codes, bar codes or some kind of visible morse codes. The patterns may be designed or arranged in a circular shape. The first to fourth markers 34, 35, 36, 37 may be attached to the hubs 24, 28, 30, 26 of the first to fourth tools 10, 12, 14, 15. For example, the patters may be printed on the hubs 24, 28, 30, 26. Each marker may represent a unique identifier (ID) so that each marker can be distinguished form each other marker. FIG. 5A shows exemplarily the first tool 10 with a first type of a first marker 34 printed on the hub 24 and designed as a code with different dots. FIG. 5B shows exemplarily the first tool 10 with an alternative second type of a first marker 34 designed as a code with dots and dashes. Alternatively, the markers 33 to 37 can be designed as emitters of (electro-) magnetic waves or fields. Each emitter may emit an electromagnetic wave of a different wavelength to distinguish each marker from another one. The electromagnetic waves may be part of the visible light spectrum. FIG. 5C shows exemplarily the first tool 10 with an alternative third type of a first marker 34 comprising a first emitter 64 and a second emitter 65 attached to the hub 24. The first and second emitters 64 and 65 may be light emitting diodes (LEDs) wherein the first emitter 64 emits a light of a first wavelength and the second emitter 65 emits a light of a second wavelength being different to the first wavelength. The first to fourth markers 34, 35, 36, 37 may be all of the same type. The basic marker 33 may be of the same type as one of the first to fourth markers 34, 35, 36, 37. The markers 33 to 37 may be designed as a retrofit kit for upgrading any implement 7.

Figure 4:
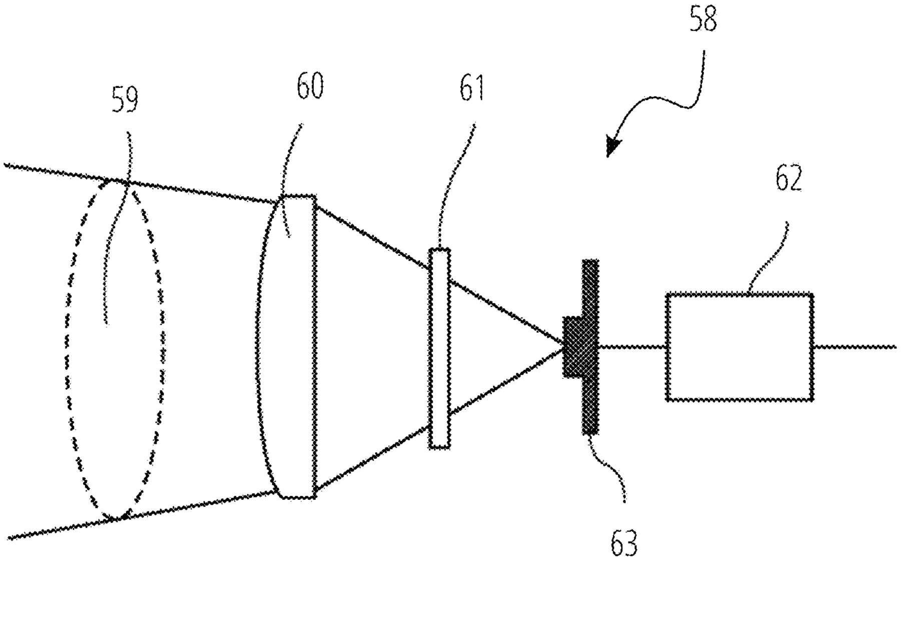
FIG. 4 illustrates a simplified view of a camera.

The sensor unit 4 may comprise one or more sensors and is configured to capture each of the basic and the first to fourth markers 33 to 37. For example, the sensor unit 4 may comprise a perception sensor 58 of any type such as a 2D or a 3D camera system in case of optical markers or a magnetic field sensor in case of emitters of magnetic fields. An example of a perception sensor 58 is depicted in FIG. 4. Optionally, the sensor unit 4 may comprise a LIDAR, a radar sensor or a combination of the aforementioned sensor types. The sensor unit 4 generates sensor information about the captured markers 33 to 37 and transfers the sensor information to the control unit 40. The sensor information may be sent wirelessly or via a wired connection between the sensor unit 4 and the control unit 40. The sensor information may comprise spatial information of each marker 33 to 37 to determine the position of each marker in space and the distances of each marker from the sensor unit 4.

Figure 2:
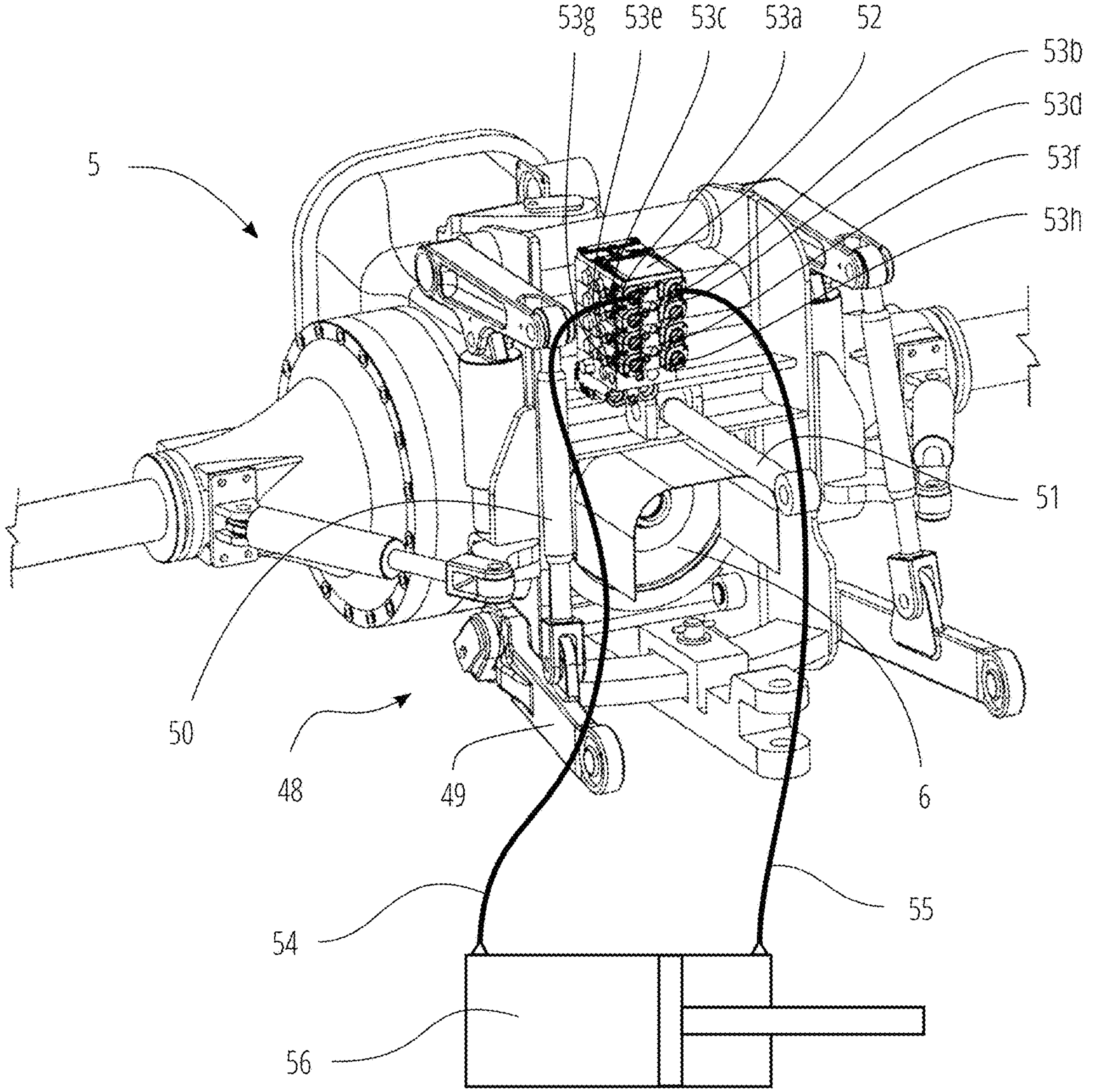
FIG. 2 illustrates a vehicle interface of the vehicle for connecting an implement.

FIG. 2 shows the vehicle interface 5 in more detail. The vehicle interface 5 comprises a hitch assembly 48, a connector bank 52 and the additional connector 6. The hitch assembly 48 comprises a left draft arm 49, an adjustable length arm 50 connected with the left draft arm 49 for adjusting the height of the left draft arm 49, a right draft arm and a top link 51. The left draft arm 49, the right draft arm and the top link 51 form a three-point linkage for connecting the implement 7. Connector 6 is a mechanical connector designed as a power take-off for providing a torque to an implement, e. g. for driving a tool of an implement. The connector bank 52 comprises eight connectors 53*a* to 53*h*. Each connector 53*a* to 53*h* can be of different type, as for example a hydraulic connector to provide a hydraulic fluid for driving a hydraulic actuator of the implement 7 or an electric connector to provide electric current for driving an electric actuator of the implement 7. In case of eight hydraulic connectors 53*a* to 53*h*, the hitch assembly 48 including the connector bank 52 may be designed as disclosed in U.S. Pat. No. 6,588,513 B1, entitled "Articulating hitch assembly", filed on Jun. 7, 2000, which is hereby incorporated by reference in its entirety.

As can be seen in FIG. 2, an actuator 56 is connected to the connector bank 52 of the vehicle interface 5. Actuator 56 may represent any actuator of the agricultural system 1 as actuator 38, actuator 39, actuator 42, actuator 43, actuator 44, actuator 45, actuator 46 or actuator 47. For example, actuator 56 may be a linear actuator such as a hydraulic cylinder as depicted in FIG. 2 representing actuator 38, 39, 45 or 47. Alternatively, actuator 56 may be an electric linear motor. Alternatively, actuator 56 may be a rotatory actuator such as a rotational hydraulic motor or a rotational electric motor representing actuator 42, 43, 44 or 46.

The actuators 38, 39, 42, 43, 44, 45, 46 and/or 47 of the implement 7 can be connected to any connectors 53*a* to 53*h* of the connector bank 52 similar to actuator 56. Depending on the type of an actuator, the actuator needs to be connected with one connector only, e. g. in case of a single-acting hydraulic cylinder, or with two or more connectors of the connector bank 52, e. g. in case of a double-acting hydraulic cylinder or an electric actuator. In FIG. 2, actuator 56 is exemplarily shown as a double-acting hydraulic cylinder connected with the connector 53*a* by line 54 and with the connector 53*b* by line 55. Actuator 56 has one translational degree of freedom for moving the piston axially in or out of the cylinder. When the control unit 40 triggers an actuation via the connector 53*a*, a hydraulic impulse will be transferred via line 54 to the actuator 56 causing the piston to move out of the cylinder. When an actuation via the connector 53*b* is triggered, a hydraulic impulse will be transferred via line 55 to the actuator causing the piston to move back into the cylinder. Alternatively in case of an actuator having one rotational degree of freedom connected with the connectors 53*a* and 53*b*, an actuation via the one or the other connector 53*a*, 53*b* would cause the actuator to rotate in a left or a right direction.

For the further description, it is assumed now, that the first actuator 42 is designed as a hydraulic motor, the second actuator 38 is designed as a double-acting hydraulic cylinder, the third actuator 43 is designed as a hydraulic motor, the fourth actuator 39 is designed as a double-acting hydraulic cylinder, actuator 44 designed as a hydraulic motor, actuator 45 designed as a double-acting hydraulic cylinder, actuator 46 designed as a hydraulic motor and actuator 47 designed as a double-acting hydraulic cylinder. In addition to connector bank 52, the vehicle interface 5 may comprise an additional connector bank in the form of connector bank 52 for connecting actuator 44, actuator 45, actuator 46 and actuator 47 of the implement 7.

As depicted in FIG. 4, the perception sensor 58 may also comprise at least one optical lens 60, an optional filter 61, a detector 62 and a processing circuitry 63. The optical lens 60 may collect and direct light from a field of view 59 of the camera through the filter 61 to the detector 62 and serve to focus and/or magnify images. The at least one optical lens 60 may be of the type of a fisheye lens, a rectilinear lens or any other standard and moderate wide-angle lens. A fish-eye lens may be of the type of a F-theta lens, a F-tan lens, a tailored distortion lens or a fovea lens, for example. A standard lens is typically defined as a lens with a focal length being approximately equal to the diagonal of the detector 62. This results in a field of view 59 that is rather similar to what human eyes see. Moderate wide-angle lenses have shorter focal lengths than standard lenses, typically ranging from 24 mm to 35 mm for full-frame cameras. These lenses offer a wider field of view 59 than standard lenses and can capture more of the scene in the frame. The optional filter 61 passes selected spectral bands such as ultraviolet, infrared or other bands. The detector 62 may be a digital image sensor that converts electromagnetic energy to an electric signal and employs image sensing technology such as charge-coupled device (CCD) technology and/or complementary metal oxide semiconductor (CMOS) technology. The processing circuitry 63 may include a circuitry for amplifying and processing the electric signal generated by the detector 62 to generate image data, which is passed to the one or more computing devices such as the control unit 40.

The perception sensor 58 of the sensor unit 4 may be moveable so that the pose (i. e. position and/or orientation) of the perception sensor 58 may change. The movement may be determined by a corresponding sensor as for example a position sensor.

The perception sensor 58 is connected with the absolute positioning system 41 for receiving and tagging a time stamp and a geo-reference for each image captured by the perception sensor 58. The data captured by the perception sensor 58 is logged along with the position and time data received from the absolute positioning system 41 allowing an accurate determination of the global position of objects contained in the captured images.

Figure 6:
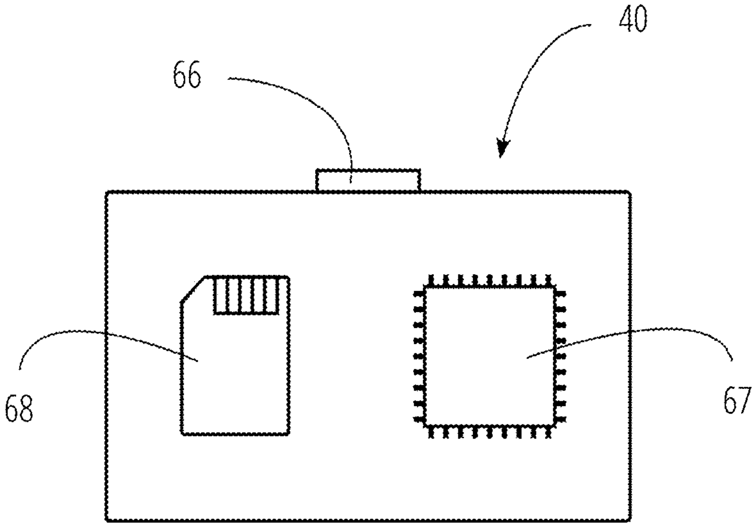
FIG. 6 illustrates a simplified view of a control unit.

FIG. 6 shows the control unit 40 comprising an interface 66, a controller 67 and a memory 68. The control unit 40 may receive and send signals or data via the interface 66. The interface 66 may be a wireless interface or a connector. The controller 67 may store the data or signals received by the control unit 40 in the memory 68. The memory 68 may contain additional data or executable computer program products, for example in terms of a computer-implemented method, that may be retrieved, processed or executed by the controller 67. Data or signals resulting from the processing of data or signals or from the execution of a computer program product may be stored to the memory 68 or sent to the interface 66 by the controller 67.

Figure 7:
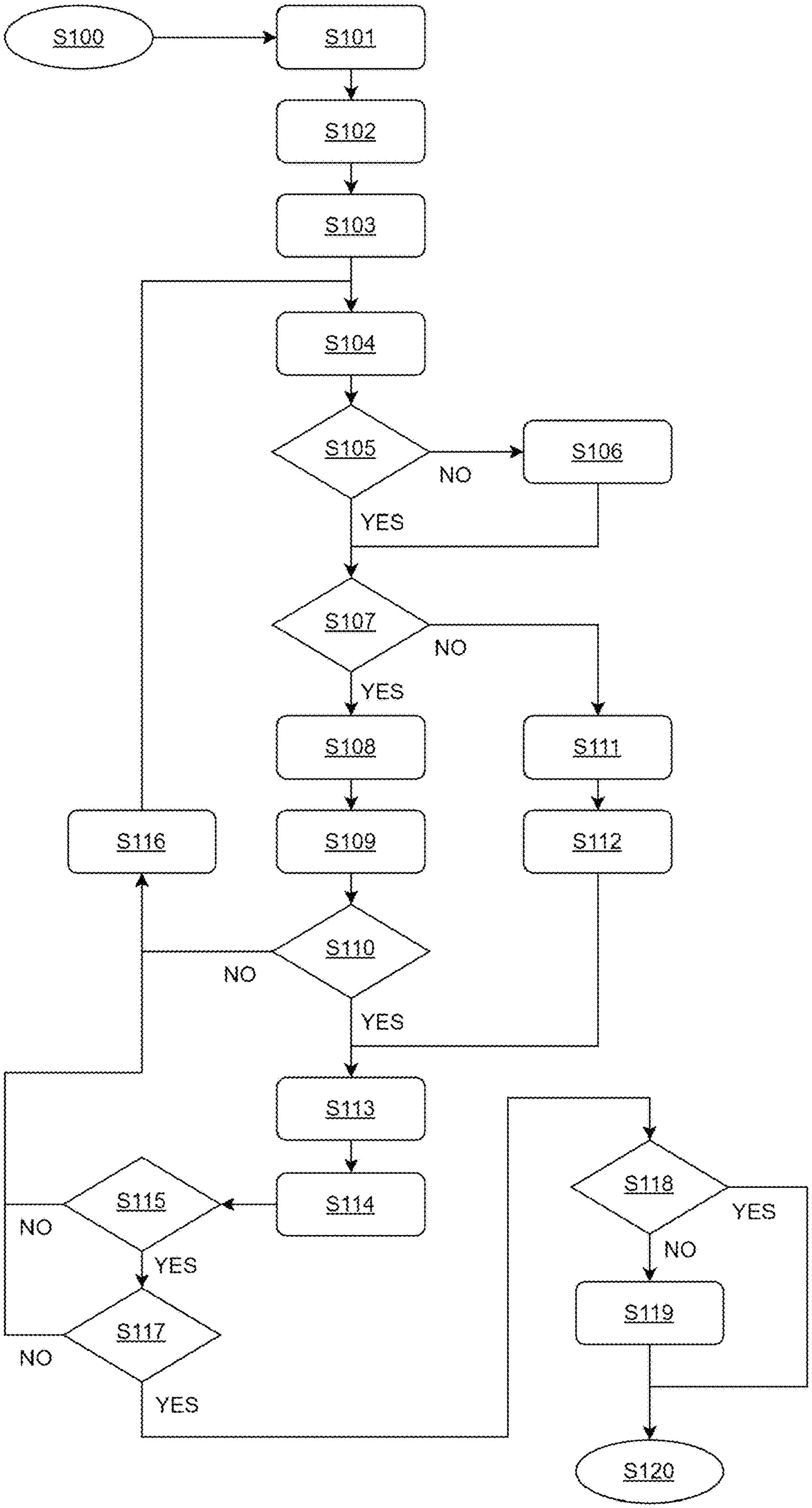
FIG. 7 illustrates a flow chart of a method executable by the control unit of FIG. 6.

FIG. 7 shows a flow chart of a method for checking controllability of a tool (10, 12, 14, 15) of the agricultural system 1. The method may be at least partly a computer-implemented method stored as a computer program product in the memory 68 of the control unit 40. The control unit 40 is configured to carry out the method. Computer-implemented parts of the method may be executed by the controller 67. The method is described by way of example of several steps without any restriction in respect of that steps. I. e. the number or the order of steps may be adapted, for example single steps may be excluded and/or added and executed earlier or later than described. The method starts with step S100 and proceeds to step S101.

At step S101, the actuators 38, 39, 42, 43, 44, 45, 46 and 47 of the implement 7 are connected with the vehicle interface 5 of the vehicle 3. The first actuator 42 can be connected to two hydraulic connectors 53*a* and 53*b*, hydraulic connectors 53*c* and 53*d*, hydraulic connectors 53*e* and 53*f* or hydraulic connectors 53*g* and 53*h*. Analogously to the first actuator 42, the second actuator 38, the third actuator 43 and the fourth actuator 39 can be connected to the hydraulic connectors 53*a* to 53*h* of the connector bank 52 which are not occupied by another actuator. Analogously, actuator 44, actuator 45, actuator 46 and actuator 47 are connected to the additional connector bank. The actuators may be connected manually by an operator. Further, the operator may connect the mounting linkage 8 of the implement 7 with the hitch assembly 48 of the vehicle interface 5 so that the implement 7 can be pulled by vehicle 3 when the vehicle 3 is driving.

The method proceeds to step S102 and the control unit 40 triggers the sensor unit 4 to capture all markers of the implement 7. The control unit 40 receives and analyses the sensor information to find all markers 33 to 37. Then, the control unit 40 defines marker 33 as basic marker, marker 34 as first marker, marker 35 as second marker, marker 36 as third marker and marker 37 as fourth marker. Since each marker is designed as a unique marker as described above, the control unit 40 can distinguish a marker, e. g. the first marker 34, form each other markers. The control unit may also recognize the basic marker 33 as a marker being fixed to the chassis member 9 of the implement 7 in contrast to the other markers 34, 35, 36 and 37 being movable in respect of the chassis member 9. Optionally, the markers 34, 35, 36 and 37 may comprise the information about the movability of the marker as part of the optical code which can be detected and read out by the control unit 40 based on the captured sensor information of the corresponding marker received from the sensor unit 4. The optical code of a marker may also comprise the information that the marker is assigned to a tool. Thus, the control unit 40 determines the number of all movable markers being movable in respect of the chassis member 9 of the implement 7.

The method proceeds to step S103 and the control unit 40 selects a connector out of the connectors 53*a* to 53*h* for triggering an actuation. For the first run, the control unit 40 determines connector 53*a* as selected connector. Then, the method proceeds to step S104.

At step S104, the control unit 40 triggers an actuation via the selected connector to send a hydraulic impulse (through one of the lines) to the actuator connected with the selected connector. The control unit 40 also triggers the sensor unit 4 to capture the first marker 34 assigned to the first tool 10, the second marker 35 assigned to the second tool 12, the third marker 36 assigned to the third tool 14 and the fourth marker 37 assigned to the fourth tool 15. In response to the triggered actuation, the actuator connected to the selected connector is actuated and causes a movement of the first, second, third or fourth tool 10, 12, 14 or 15 and the marker assigned to the tool. The sensor unit 4 captures the moving marker and all other markers (34 to 37) and sends the sensor information to the control unit 40.

The method proceeds to step S105 and the control unit 40 receives the sensor information of the captured markers 34 to 37 from the sensor unit 4. Based on the received sensor information, the control unit determines whether the first marker 34 moves in response to the triggered actuation via the selected connector. If so, the control unit 40 defines the first marker 34 as moving marker.

If not, the method proceeds to step S106 and the control unit 40 checks whether the second marker 35 or any other marker moves in response to the triggered actuation via the selected connector to determine which of the markers moves in response to the triggered actuation and to define this marker as moving marker. The control unit 40 may also create a status message to inform an operator that no actuator of the first tool 10 is connected with the selected connector. The control unit 40 may also inform the operator which of the second, third or fourth tools 12, 14, 15 moves.

After step S105 or S106, the method proceeds to step S107 and the control unit 40 checks whether the moving marker moves in a first degree of freedom in response to the triggered actuation via the selected connector. The control unit 40 may determine the first degree of freedom based on a first movement of the moving marker in response to the triggered actuation or if a further movement of the moving marker is in alignment with the first degree of freedom already determined. But if the further movement of the moving marker is not in alignment with the first degree of freedom, the control unit 40 will determine a second degree of freedom.

If the moving marker moves in the first degree of freedom, the method proceeds to step S108 and the control unit 40 determines the type of the first degree of freedom of the moving marker based on the sensor information received from the sensor unit 4. The control unit 40 determines whether the moving marker moves rotationally or translationally. If the moving marker is rotating about its rotation axis (11, 13, 57) or pivoting about its pivot axis, the control unit 40 determines a rotational first degree of freedom of the moving marker. If the moving marker moves translationally, the control unit 40 determines a translational first degree of freedom of the moving marker.

Then, the method proceeds to step S109 and the control unit 40 determines the direction of movement of the moving marker in the first degree of freedom based on the sensor information. In case of a rotational degree of freedom, the control unit 40 determines a rotation in a left or a right direction. In case of a translational degree of freedom, the control unit 40 determines a movement in a forward or backward direction.

The method proceeds to step S110 and the control unit 40 determines whether the moving marker moves in the first degree of freedom only or moves simultaneously in the first degree of freedom and in the second degree of freedom in response to the triggered actuation via the selected connector. If the moving marker moves in the first degree of freedom only, the method proceeds to step S113. If the moving marker moves in both the first degree of freedom and the second degree of freedom, the method proceeds steps back to step S104.

If the control unit 40 has determined at step S107 that the moving marker does not move in the first degree of freedom, the method proceeds to step S111. At step S111, the control unit 40 determines the type of the second degree of freedom of the moving marker based on the sensor information received from the sensor unit 4. The control unit 40 determines whether the moving marker moves rotationally or translationally. If the moving marker is rotating about its rotation axis (11, 13, 57) or pivoting about its pivot axis, the control unit 40 determines a rotational second degree of freedom of the moving marker. If the moving marker moves translationally, the control unit 40 determines a translational second degree of freedom of the moving marker.

Then, the method proceeds to step S112 and the control unit 40 determines the direction of movement of the moving marker in the second degree of freedom based on the sensor information. In case of a rotational degree of freedom, the control unit 40 determines a rotation in a left or a right direction. In case of a translational degree of freedom, the control unit 40 determines a movement in a forward or backward direction. Then, the method proceeds to step S113.

At step S113, the control unit 40 determines a potential end position of the degree of freedom of the moving marker depending on whether the tool to which the moving marker is assigned to can move unlimitedly in a movement direction or not. The control unit 40 actuates the actuator for actuating the tool to which the moving marker is assigned to via the selected connector for a predefined period of time, e. g. 5 seconds, and triggers the sensor unit 4 to capture the moving marker. If an end stop, e. g. a mechanical end stop, is present, the tool will stop moving when the tool gets in contact with the end stop even if the tool is still actuated by the actuator. Hence, the moving marker assigned to the tool will stop to move, too. The control unit 40 will detect a stop of the movement of the moving marker assigned to the tool and determine a position of the end position based on the sensor information received from the sensor unit 4. Additionally, the control unit 40 may store the position of the detected end position to the memory 68 of the control unit 40. If the control unit 40 has determined two end positions of a degree of freedom, such as for example an initial position and a final position, the control unit 40 may also determine an operational range of the degree of freedom between the initial and the final positions. As exemplarily can be seen in FIG. 2, the piston of actuator 56 can be moved within the cylinder between a left end stop and a right end stop. Thus, the movement of the tool operated by this actuator 56 is limited by two end stops. The control unit 40 would determine two end positions of the degree of freedom of the marker assigned to this tool accordingly. These two end positions may correspond to an unfolded position and a folded position of the first to fourth tool holders 16, 17, 18, 19 since the actuators 38, 39, 45 and 47 for actuating the first to fourth tool holders 16, 17, 18, 19 are designed as hydraulic cylinders similar to actuator 56.

If no end stop is present, the tool can move unlimitedly in a movement direction. Hence, the moving marker assigned to the tool can move unlimitedly, too. The control unit 40 will detect no stop of the movement of the moving marker assigned to the tool accordingly. Additionally, the control unit 40 may store the information of the absence of an end stop to the memory 68 of the control unit 40. For example, the tool can move unlimitedly in a movement direction in case of a rotational actuator such as actuators 42, 43, 44 and 46. Then, the method proceeds to step S114.

At step S114, the control unit 40 determines the type of the joint of the tool to which the moving marker is assigned to. The control unit 40 may determine the type of the joint based on the determined type of the degree of freedom of the moving marker and/or based on a determined end position of the degree of freedom of the moving marker as determined before. For example, a revolute joint providing unlimited rotational movement of a tool in a left or right movement direction may be detected based on a rotational degree of freedom without any end positions of the degree of freedom of the corresponding moving marker. A prismatic joint providing a limited translational movement of a tool may be detected based on a translational degree of freedom and two end positions of the translational degree of freedom of the corresponding moving marker. Analogously, the control unit 40 can determine other types of joints such as a geared revolute joint (gearbox), a combination of two revolute joints connected in series (providing two rotational degrees of freedom), a cylindrical joint (providing an translational and a rotational degree of freedom), a ball joint, a socket joint (ball), a slider joint with rotation around the translation axis (piston), etc. The information about the type of the joint of the tool to which the moving marker is assigned to can be stored in the memory 68 of the control unit 40.

Then, the method proceeds to step S115 and the control unit 40 checks whether all markers connected to a tool, here markers 34, 35, 36 and 37, have been moved so far. The number of all markers connected to a tool has been determined before (see step S102). So, the control unit 40 can check whether this number corresponds to the number of markers for which a movement could be detected. If not all markers connected to a tool have been moved, the method proceeds to step S116. Otherwise, the method proceeds to step S117.

At step S116, the control unit 40 selects a connector out of the connectors 53*a* to 53*h* as selected connector for triggering an actuation that has not been selected as selected connector before. The control unit 40 may sequentially select the next selected connector, for example based on a specific order such as an ascending order as connector 53*a*, connector 53*b*, connector 53*c*, . . . , connectors 53*h*. Then, the method steps back to step S104.

At step S117, the control unit 40 checks whether an actuation has been triggered via all connectors 53*a* to 53*h*. If not the method proceeds to step S116. Otherwise, the method proceeds to step S118.

At step S118, the control unit 40 triggers two or more actuations via at least two different connectors (53*a* to 53*h*) in a predefined sequence and checks whether the movements of the markers comply with the predefined sequence. The predefined sequence defines via which connector at which time point (or in which order) an actuation is triggered by the control unit 40. For example, the predefined sequence defines to trigger connector 53*c*, then connector 53*f*, then connector 53*a*, then connector 53*b* and finally connector 53*c* again. Depending on how the actuators 38, 39, 42, 43, 44, 45, 46 and/or 47 have been connected to the vehicle interface 5 at step S101, the actuators will actuate the corresponding tools according to the triggered actuations and cause movements of the markers assigned to the actuated tools. The movements of the markers are captured by the sensor unit 4. Based on the received sensor information, the control unit 40 analyses the movements of the markers and checks for each marker whether the correct markers moved in the correct degree of freedom in the correct direction. I. e., the control unit 40 checks whether the determined movements of the markers caused by the executed sequence of triggers comply with an expected sequence of movements of the markers. The expected sequence may be stored in the memory 68 of the control unit 40 and the control unit 40 may compare the expected sequence with the determined sequence to determine any deviation of the determined sequence from the expected sequence. If the movements of the markers comply with the predefined sequence, the method proceeds to step S120. If not, the method proceeds to step S119 and the control unit 40 creates a corresponding error message and may advice the operator how the actuators should be connected to the vehicle interface 5 so that the movements of the markers will comply with the predefined sequence. After step S119, the method proceeds to step S120.

At step S120, the method ends and may be restarted with step S100 again. Finally, the controllability of each tool 10, 12, 14, 15 of the agricultural system 1 has been checked by the method by checking which tools can be actuated (or not), in which degree of freedom a tool is moving when it is actuated and/or in which movement direction the tool is moving.

As mentioned above, the method has been explained by way of example of hydraulic actuators connected to hydraulic connectors. But the implement 7 may comprise one or more actuators of a different type such as an electric motor connected to one or more electric connectors of the vehicle interface 5. Then, the actuations triggered by the control unit 40 would be of the corresponding type of the actuator, e. g. of electrical type to send an electrical impulse instead of a hydraulic impulse wherein the method steps can be executed analogously as described above.

All references cited herein are incorporated herein in their entireties. If there is a conflict between definitions herein and in an incorporated reference, the definition herein shall control.

| LISTING OF DRAWING ELEMENTS |
|---|
| 1 agricultural system |
| 2 agricultural field |
| 3 vehicle |
| 4 sensor unit |
| 5 vehicle interface |
| 6 connector |
| 7 implement |
| 8 linkage |
| 9 chassis member |
| 10 first tool |
| 11 rotation axis |
| 12 second tool |
| 13 rotation axis |
| 14 third tool |
| 15 fourth tool |
| 16 first tool holder |
| 17 second tool holder |
| 18 third tool holder |
| 19 fourth tool holder |
| 20 hinge joint |
| 21 hinge joint |
| 22 hinge joint |
| 23 hinge joint |
| 24 hub |
| 25 tine |
| 26 hub |
| 27 tine |
| 28 hub |
| 29 tine |
| 30 hub |
| 31 tine |
| 32 wheel |
| 33 basic marker |
| 34 first marker |
| 35 second marker |
| 36 third marker |
| 37 fourth marker |
| 38 actuator |
| 39 actuator |
| 40 control unit |
| 41 absolute positioning system |
| 42 actuator |
| 43 actuator |
| 44 actuator |
| 45 actuator |
| 46 actuator |

-continued

| LISTING OF DRAWING ELEMENTS |
|---|
| 47 actuator |
| 48 hitch assembly |
| 49 draft arm |
| 50 adjustable length arm |
| 51 top link |
| 52 connector bank |
| 53a connector |
| 53b connector |
| 53c connector |
| 53d connector |
| 53e connector |
| 53f connector |
| 53g connector |
| 53h connector |
| 54 line |
| 55 line |
| 56 actuator |
| 57 rotation axis |
| 58 perception sensor |
| 59 field of view |
| 60 lens |
| 61 filter |
| 62 detector |
| 63 processing circuitry |
| 64 emitter |
| 65 emitter |
| 66 interface |
| 67 controller |
| 68 memory |

What is claimed is:

1. An agricultural system, comprising:

a vehicle interface with at least two connectors for connecting at least one actuator;

an implement comprising:

a chassis member;

a first tool relatively moveable in a first degree of freedom in respect of the chassis member; and a first marker assigned to the first tool;

the agricultural system further comprising:

a sensor unit configured to capture the first marker;

a first actuator connectable with at least one of the at least two connectors for moving the first tool in the first degree of freedom; and a control unit configured to:

receive sensor information from the sensor unit;

trigger an actuation via one of the at least two connectors;

determine whether the first marker moves in the first degree of freedom only or in a first and a second degree of freedom in response to the triggered actuation via the one connector;

responsive to determining that the first marker does not move in the first degree of freedom in response to the triggered actuation via the one connector, output an error to indicate that the first marker may be connected to a wrong connector of the vehicle or unconnected; and responsive to determining that the first marker does not move in the first degree of freedom in response to the triggered actuation via the one connector, output an indication that the first marker is actuating as expected.

2. The agricultural system of claim 1, wherein the control unit is further configured to determine the direction of the movement of the first marker.

3. The agricultural system of claim 1, wherein the first marker comprises an optical code.

4. The agricultural system of claim 1, wherein the control unit is further configured to determine the number of markers assigned to tools.

5. The agricultural system of claim 1, wherein the control unit is further configured to distinguish the first marker from other markers.

6. The agricultural system of claim 1, wherein the control unit is further configured to trigger actuations sequentially via at least two of the at least two connectors.

7. The agricultural system of claim 1, wherein the first degree of freedom is of a rotational type or a translational type.

8. The agricultural system of claim 1, wherein the control unit is further configured to determine whether the first marker moves rotationally or translationally in response to the triggered actuation via the one connector.

9. The agricultural system of claim 1, wherein the control unit is further configured to determine any end position of the first degree of freedom.

10. The agricultural system of claim 8, wherein the first tool is moveably connected with the chassis member by at least one joint, and wherein the control unit is configured to determine the type of the joint.

11. The agricultural system of claim 1, further comprising:

a second actuator connectable with at least one of the connectors for moving the first tool in a second degree of freedom different to the first degree of freedom;

wherein the first tool is moveable in the second degree of freedom in respect of the chassis member; and wherein the control unit is configured to determine whether the first marker moves in the first degree of freedom or in the second degree of freedom in response to the triggered actuation via the one connector.

12. The agricultural system of claim 1, further comprising:

a second tool relatively moveable in respect of the chassis member;

a second marker assigned to the second tool; and at least a third actuator connectable with at least one of the connectors for moving the second tool;

wherein the sensor unit is configured to capture the second marker; and wherein the control unit is configured to determine whether the first marker or the second marker moves in response to the triggered actuation via the one connector.

13. The agricultural system of claim 1, wherein the control unit is further configured to:

trigger an actuation via each of the at least two connectors; and determine whether all markers connected with tools have been moved when an actuation via each of the connectors has been triggered.

14. The agricultural system of claim 1, wherein the control unit further is configured to:

trigger an actuation via each of the at least two connectors according to a predefined sequence; and check whether the movement of the first marker complies with the predefined sequence.

15. The agricultural system of claim 1, wherein vehicle interface comprises at least two connectors; and wherein two of the at least two of the connectors are of a different type.

16. A method of checking a controllability of a tool of an agricultural system having at least two connectors for moving a first tool comprising a first marker, the method comprising:

connecting a first actuator with at least one of the least two connectors for moving the first tool in a first degree of freedom;

triggering an actuation via one connector;

receiving sensor information from a sensor unit capturing a first marker assigned to the first tool;

determining whether the first marker moves in the first degree of freedom only or in a first and a second degree of freedom in response to the triggered actuation via the one connector;

responsive to determining that the first marker does not move in the first degree of freedom in response to the triggered actuation via the one connector, outputting an error to indicate that the first marker may be connected to a wrong connector of the vehicle or unconnected; and responsive to determining that the first marker does not move in the first degree of freedom in response to the triggered actuation via the one connector, outputting an indication that the first marker is actuating as expected.

17. The method of claim 16, comprising:

determining whether the first marker moves in a first degree of freedom only or in a first and a second degree of freedom; and determining a type of a joint of the first tool if the first marker moves in the first degree of freedom only.

18. The method of claim 16, comprising:

connecting a second actuator with at least one of the connectors for moving the first tool comprising the first marker in a second degree of freedom; and determining whether the first marker moves in the first degree of freedom or in the second degree of freedom in response to the triggered actuation via the one connector.

19. The method of claim 16, comprising:

connecting at least a third actuator with at least one of the connectors for moving a second tool comprising a second marker; and determining whether the first marker or the second marker moves in response to the triggered actuation via the one connector.

* * * * *